United States Patent

[11] 3,603,912

| [72] | Inventor | William E. Kelly<br>Bradley Beach, N.J. |
|---|---|---|
| [21] | Appl. No. | 852,863 |
| [22] | Filed | Aug. 25, 1969 |
| [45] | Patented | Sept. 7, 1971 |
| [73] | Assignee | Thomas & Betts Corporation<br>Elizabeth, N.J. |

[54] RACEWAY TERMINATOR
4 Claims, 4 Drawing Figs.

[52] U.S. Cl. ............................................. 339/89 C,
174/65 SS, 339/177 R
[51] Int. Cl. .......................................... H01r 13/54
[50] Field of Search .................................. 339/14, 89,
177; 174/65 SS, 78

[56] References Cited
UNITED STATES PATENTS
| 2,821,567 | 1/1958 | Bergan | 174/78 |
| 3,227,803 | 1/1966 | Gohs | 174/78 |
| 3,424,853 | 1/1969 | Johnson III | 174/35 |
| 3,448,430 | 6/1969 | Kelly | 339/143 |
| 3,492,410 | 1/1970 | Kelly | 174/78 |
| 3,493,672 | 2/1970 | Bromberg | 174/78 |

*Primary Examiner*—Joseph H. McGlynn
*Attorney*—David Teschner

ABSTRACT: A raceway terminator for coupling a jacketed flexible metallic raceway to an electrical enclosure comprising a body portion, a gland nut for assembly therewith, a grounding cone and a sealing ring. The sealing ring has tapered leading and trailing edges and an annular shoulder thereabout which cooperate with an annular rib on the gland nut to provide for the holding of the jacketed flexible metallic raceway as well as providing a moisture seal therebetween and preventing abrasion of the jacket of the raceway by the terminator.

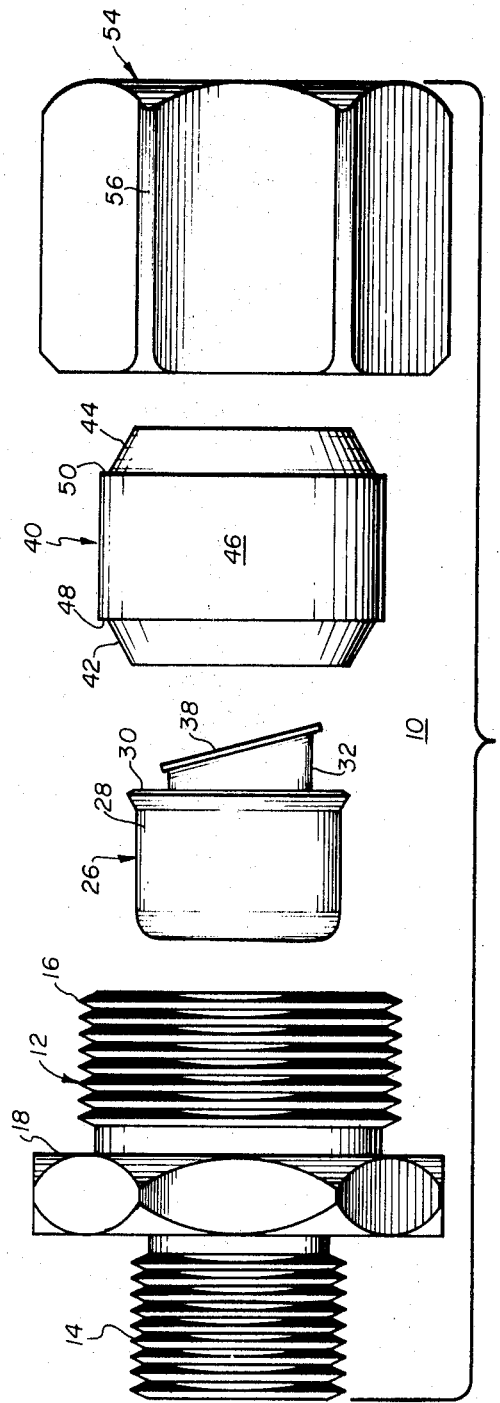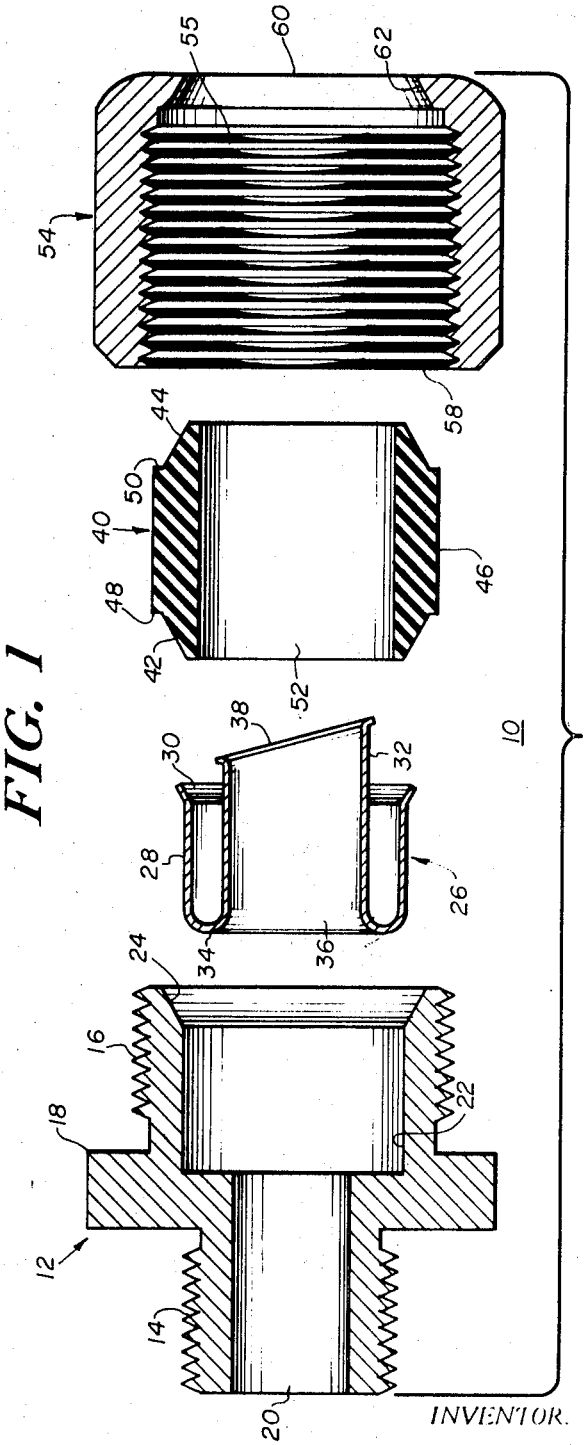

INVENTOR.
WILLIAM E. KELLY
BY David Teselme
ATTORNEY

RACEWAY TERMINATOR

CROSS-REFERENCE TO RELATED APPLICATIONS

The grounding cone generally described in this application is shown in greater detail and claimed in my copending application Ser. No. 656,212, filed July 26, 1967, now U.S. Pat. No. 3,492,410 issued Jan. 27, 1970, by William E. Kelly, entitled "Jacketed flexible metallic Conduit connector" and assigned to the assignee of the instant invention.

BACKGROUND OF THE INVENTION

1B. Field of the Invention

The raceway terminator of the instant invention is employed for the coupling of a flexible metallic raceway, both jacketed and unjacketed, to electrical enclosures such as junction boxes or the like. It may further be employed in the joining of two such flexible metallic raceways.

2. Description of the Prior Art

In prior art raceway terminating devices, a body member, a grounding cone, a sealing ring and a gland nut were employed to couple a jacketed flexible metallic raceway to an electrical enclosure. A sealing ring was generally employed to provide for grasping the metallic raceway and sealing was provided by means of the metal-to-metal contracts of the portions of the terminator device. Mismatching, or poor forming, of the threads of the body portion and the gland nut resulted in passageways for the passage of moisture through the connector to the termination. Some minor distortion of the raceway as a result of the distortion of the sealing ring during assembly of the gland nut to the body portion occurred. Due to the rigidity and the form of the sealing ring, the leakage of moisture was found to reduce the overall utility of such terminating device.

SUMMARY OF THE INVENTION

The present invention overcomes the difficulties noted above with respect to prior art terminating devices by providing a raceway terminator which securely fastens the jacketed flexible metallic raceway to the terminator device and which provides moisture seals thereabout to prevent the entrance of moisture into the electrical enclosure or to the interior of the jacketed flexible metallic raceway and which further provides a good electrical ground between the metallic sheath of the raceway and the body member of the terminating device. The body member has a first externally threaded portion for insertion within the knock out of the electrical enclosure and for the receipt of a locknut and fastening nut thereon to securely fasten the body portion to the electrical enclosure wall. A second externally threaded portion is arranged for the receipt thereon of the internally threaded portion of the gland nut for assembly of the components of the raceway terminator and the raceway itself. Wrench flats are provided between the externally threaded portions of the body member for tightening the overall raceway terminator and for assembling the body member to the electrical raceway. Within the second externally threaded portion is a cavity for receipt of the grounding cone, the ends of the cavity being tapered outwardly from the cavity. The sealing ring, having tapered leading and trailing edges, of a taper corresponding to that of the taper of the body member, and having an angular ring thereabout, forming leading and trailing sealing shoulders, is then inserted within the grounding cone. The grounding cone includes an internal section with an outwardly extending helical rib for engagement with the voids between the convolutions of the metallic sheath of the raceway, whereby an electrical grounding path is established between such sheath and the body member of the raceway terminator. Further, the gland nut is provided with a downwardly extending tapered annular rib, which is to engage the trailing tapered edge of the sealing ring and force the trailing tapered edge of the sealing ring into intimate contact with the metallic raceway, plus holding the raceway to the raceway terminator. Further, the contact between the rib of the gland nut and the sealing ring provides a moisture seal at this point. The extension of the sealing ring beyond the gland nut, when the raceway terminator is assembled, will give a visual indication of the presence of the sealing ring within the raceway terminator, and will protect the jacket of the raceway from abrasion by the gland nut. When fully assembled, the gland nut will force the leading shoulder of the sealing ring into intimate contact with the end of the body member to provide a plastic-to-metal seal and will further cause the leading edge of the sealing ring to deform, so as to engage the jacket of the flexible metallic raceway, further increasing the holding power of the raceway terminator to the raceway. By the use of a semiflexible, yieldable plastic sealing ring of the general configuration set forth above and with the addition of the rib to the gland nut, plastic-to-metal seals will be provided at all important points of the raceway terminator to prevent the introduction of moisture within the raceway or within the electrical enclosure to which the raceway is coupled. It is therefore an object of this invention to provide an improved form of a raceway terminator.

It is yet another object of this invention to provide an improved form of raceway terminator providing plastic-to-metal seals to prevent the introduction of moisture within the raceway terminator.

It is yet another object of this invention to provide an improved raceway terminator which, when assembled, increases the reliability of the ground path established from the core of the jacketed flexible metallic raceway to the body member of the raceway terminator.

It is still another object of this invention to provide an improved raceway terminator which provides at least two means for the grasping of the jacketed flexible metallic raceway to which it is coupled.

It is yet another object of this invention to provide an improved raceway terminator with provisions for protecting the jacket of a jacketed flexible metallic raceway against abrasion from the raceway terminator itself.

Other objects and features of the invention will be pointed out in the following description and claims and illustrated in the accompanying drawings, which disclose, by way of example, the principle of the invention, and the best mode which has been contemplated for carrying it out.

BRIEF DESCRIPTION OF THE DRAWINGS

In the drawings in which similar elements are given similar reference characters:

FIG. 1 is a side elevation, in exploded form, of the components which constitute a raceway terminator constructed in accordance with the concepts of the invention.

FIG. 2 is a side elevation, in section and exploded form, of the raceway terminator of FIG. 1.

Figure 3:
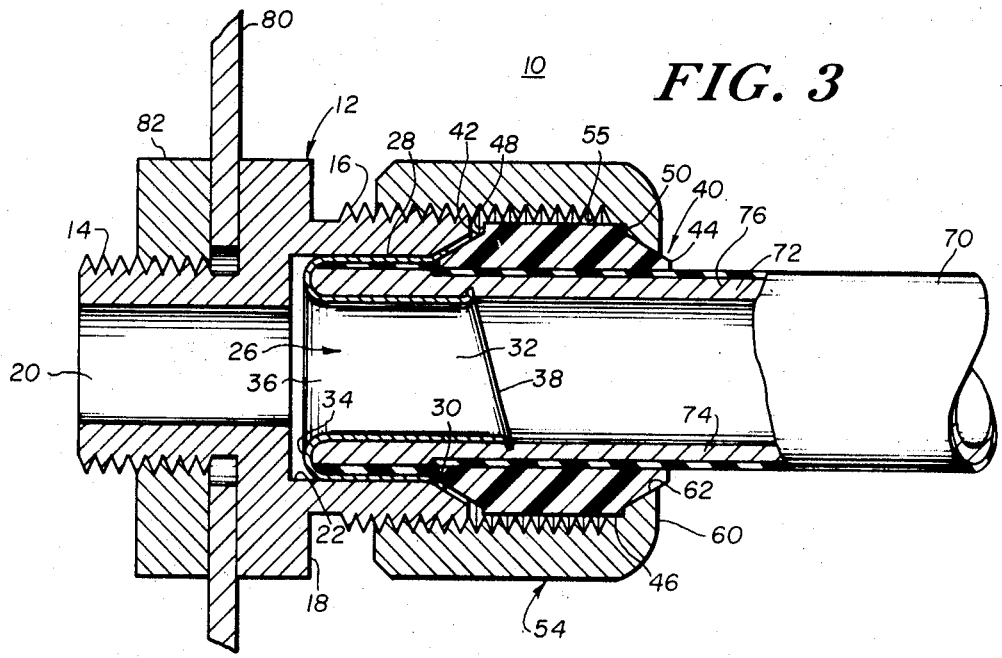
FIG. 3 is a side elevation, in section, of the raceway terminator of FIG. 1, partially assembled to a raceway.

FIG,. 4 is a side elevation, in section, of the raceway terminator of FIG. 1, fully assembled to a raceway.

DESCRIPTION OF THE PREFERRED EMBODIMENTS

Turning now to FIGS. 1 and 2, there is shown a raceway terminator 10 constructed in accordance with the concepts of the invention. Raceway terminator 10 is formed of a body member 12 having a first externally threaded portion 14 for insertion into the knockout, or socket, of an electrical enclosure or the like (not shown). A locknut, nut, or other suitable fastening device (not shown) will then be screwed upon the threaded portion 14 to securely fasten body member 12 to the wall of the electrical enclosure. A second externally threaded portion 16 is provided for the receipt thereon of the internally threaded portion of a gland nut to be described below. Extending between the threaded portions 14 and 16 are a series of wrench flats 18 for aiding in the assembly of the body member 12 to the electrical enclosure and for assembly of the overall raceway terminator 10. A longitudinal passage 20 (FIG. 2) extends through the first externally threaded portion 14 and within the wrench flats 18 and terminates in an enlarged cavity 22 having an outwardly tapered entrance as at 24. A grounding cone 26, having an outer sleeve 28, is proportioned to fit wholely within the cavity 22 of the body member 12. The outer sleeve 28 of the grounding cone 26 is tapered as at 30. Grounding cone 26 also has an inner sleeve 32 which is joined to the outer sleeve 28 as at 34. A longitudinal passage 36 extends through the length of the inner sleeve 32. The end of the inner sleeve 32 remote from the jointure 34 has an outwardly extending rib 38 to make contact with the voids between the convolutions making up the inner metallic core of the jacketed flexible metallic raceway. The details of the grounding cone 26, as set forth and claimed in the above cited copending application, will only be described herein as in necessary for a full understanding of the manner of operation of the raceway terminator 10.

A sealing ring 40 is fabricated with tapered leading edge 42 and tapered trailing edge 44, the tapers of the tapered edges 42 and 44 are made complementary with the taper 24 leading into the cavity 22 of the body member 12. Annular ring 46 is provided about the periphery of the sealing ring 40 to provide a leading sealing shoulder 48 and a trailing sealing shoulder 50. As is better seen in FIG. 2, a longitudinal passage 52 extends through the entire length of the sealing ring 40. When assembled, tapered leading edge 42 will be inserted between the outer sleeve 28 and the inner sleeve 32 of grounding cone 26. The final member of the raceway terminator 10 is a gland nut 54 having a plurality of ridges 56 spaced about its periphery. A longitudinal passage 58 runs through the length of the gland nut 54 and is interrupted by an internal annular rib 60 which somewhat decreases diameter of the longitudinal passage 58 at one end and internal screw threads 55 at the opposite end. The annular rib 60 terminates in a tapered end 62 which, as will be described below, bears upon the trailing tapered edge 44 of the sealing ring 40.

Turning now to FIG. 3, there is shown the manner of assembly of the raceway terminator 10 with a jacketed flexible metallic raceway 70. The jacketed metallic raceway 70 has an internal flexible metallic core 72 having a number of convolutions 74, between which are located voids 76. The body portion 12 of the terminator 10 is placed so that the externally threaded portion 14 is inserted within a knockout of the wall of an electrical enclosure 80 to securely fasten the body portion 12 to the wall 80. A nut 82 will be fastened to the threaded portion 14 to securely fasten body portion 12 to the wall 80. In such assembly, the wrench flats 18 may be employed to prevent rotation of the body member 12 when nut 82 is applied. The gland nut 54 is then placed upon the end of the raceway 70 and moved there along a distance sufficient so as not to interfere with the further portions of the raceway terminator 10 to be put thereon. Next, the sealing ring 40 is slid over the outer surface of the raceway 70, permitting the raceway 70 to extend through the longitudinal passage 52 and keeping the sealing ring 40 in a position where it will not interfere with further assembly of the raceway terminator 10. Grounding cone 26 is now screwed into the core 72 of the raceway by engaging the outwardly extending rib 38 with the voids 76 between the convolutions 74 thereof. Grounding cone 26 is screwed into position until the end of the raceway 70 is in engagement with the jointure 34 between the inner metallic sleeve 32 and the outer metallic sleeve 28 of the grounding cone 26. At this point, the raceway 70 will substantially fill the space existing between the inner metallic sleeve 32 and the outer metallic sleeve 28 of the grounding cone 26. The sealing ring 40 is now slid down the raceway 70 such that its tapered leading edge 42 passes under the taper 30 of the outer sleeve 28 of the grounding cone 26 and enters the space between the outer surface of the raceway 70 and the inner surface of the outer sleeve 28 of the grounding cone 26. The gland nut 54 is now slid to position its internal threaded portion 55 in engagement with the threaded portion 16 of the body member 12. The gland nut 54 may then be freely rotated to cause engagement of its threaded portion 55 with the externally threaded portion 16 of the body member 12. FIG. 3 represents the body portion 12 securely fastened to the wall 80 of an electrical enclosure and represents the gland 54 loosely coupled to the threaded portion 16 of the body member 12.

Figure 4:
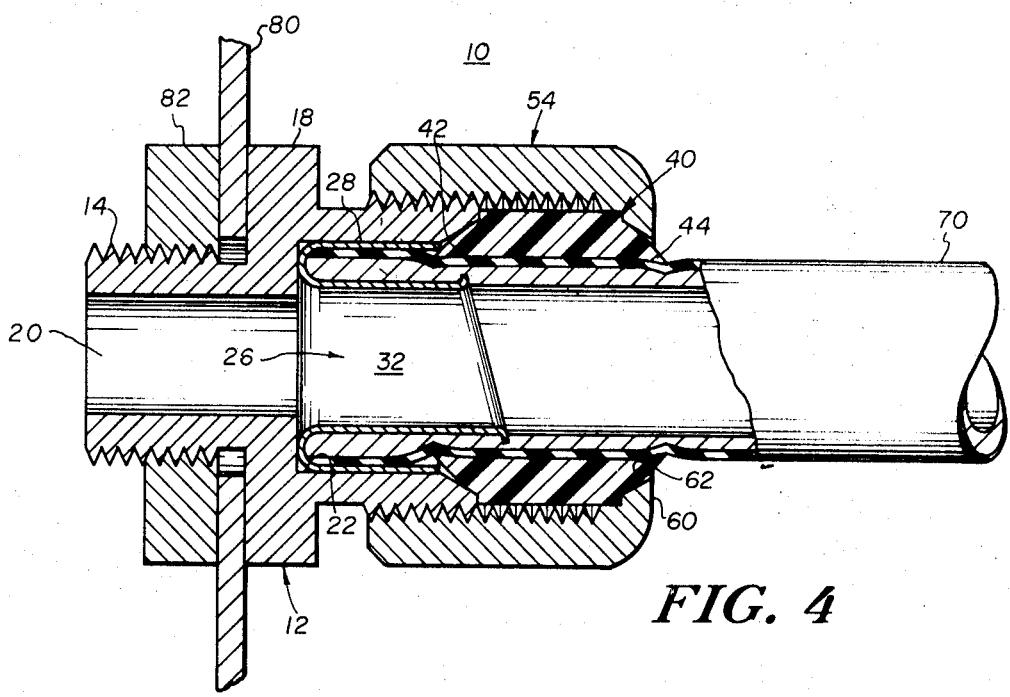

Turning now to FIG. 4, the final assembly of the gland nut 54 with the body portion 12 is shown. As the gland nut 54 is tightened the annular rib 60 of the gland 54 engages the trailing surface 44 of the sealing ring 40 and causes the sealing ring 40 to wedge the leading tapered edge 42 further under the outer sleeve 28 of the grounding cone 26. As a result, a good electrical contact is made between the outer sleeve 28 of the grounding cone 26 and the walls of the cavity 22 of the body member 12, particularly along the tapered portion 24 leading into the cavity 22. Further tightening of the gland nut 54 will bring the leading sealing shoulder 48 of the sealing ring 40 into contact with the end of the body portion 12 to form a good moisture seal therebetween by providing a plastic-to-metal seal, the plastic conforming to the shape of the metal of the body portion 12 compensating for any irregularities therein. Further, due to the leading tapered edge 42 of the sealing ring 40 riding the taper 24 of the body portion 12, the leading edge thereof will be deformed, causing deformation of the jacket of the raceway 70, providing for gripping of the raceway 70 by the sealing ring 40. Further, the annular rib 60 will cause biting into the trailing tapered edge 44 of the sealing ring 40 due to the reduction in the cross section of edge 44, causing it also to bite into and compress the outer jacket of the raceway 70, providing further holding power. In addition, the correspondence between the taper 62 of the annular rib 60 and the taper of the trailing edge 44 of the sealing cone 40 will provide a further moisture seal therebetween. In addition, it should be noted that the sealing ring 40 extends beyond the gland nut 54, providing a clear indication of the presence of the sealing ring and providing a moisture seal to prevent the entrance of moisture along the surface of the raceway into the raceway termination 10. Further, the extension of the sealing ring 40 beyond the gland nut 54 prevents abrasion of the jacket of the raceway 70 against the gland nut 54. The presence of the trailing sealing shoulder 50 further insures that a good moisture seal will be provided between the gland nut 54 and the sealing ring 40. The final tightening of the gland nut 54 will also insure that the juncture 34 between the outer metallic sleeve 28 and the inner metallic sleeve 32 will contact the rear portion of the cavity 22 assuring the greatest possible electrical coupling between the outer sleeve of the grounding cone 26 and the body member 12. It should be noted that in each instance there is a plastic-to-metal seal for the prevention of the entrance of moisture along the various components of the raceway terminator. The plastic member, that is the sealing ring 40, will be allowed to deform in various spots to create a good plastic-to-metal seal which will match any irregularities of the contour of the metal, thus assuring the desired moisturetight seal.

The embodiments of the invention in which an exclusive property or privilege is claimed are defined as follows:

1. In a connector for coupling a flexible metallic conduit to an electrical enclosure, said coupling having a body member, a gland nut, and a grounding cone therebetween, each having a longitudinal passage therethrough for receiving said conduit therein, said body member having an externally threaded portion adjacent one end thereof and said gland nut having an internally threaded portion for assembly with said externally threaded portion of said boy member, the improvement comprising: a tapered annular ring disposed in said longitudinal passage at the end of said gland nut remote from said internally threaded portion; and a deformable sealing ring having a tapered leading edge, a tapered trailing edge, and a longitudinal passage therethrough to accept said conduit therein; said sealing ring being positionable intermediate said grounding cone and said gland nut tapered annular ring; said tapered leading edge of said sealing ring being arranged to bear against said grounding cone; said gland nut tapered annular ring being arranged to bear directly against said tapered trailing edge of said sealing ring, the inside diameter of said tapered annular ring being proportioned to accept at least a portion of said sealing ring tapered trailing edge between the inner edge of said tapered annular ring and the outer surface of a conduit positioned therein, wherein upon the assembly of said gland nut to said body member with said cone, ring and conduit therein, said tapered annular ring is caused to intimately bear against a portion of said sealing ring tapered trailing edge, to urge said tapered trailing edge into engagement with the adjacent surface of the conduit positioned therebetween, forming a moisture seal thereat.

2. The improvement as defined in claim 1 wherein the taper of said tapered annular ring is formed substantially complementary of the taper of said sealing ring trailing edge to provide intimate mating cooperable engagement between the respective contacting surfaces thereof, forming a moisture seal therebetween.

3. The improvement as defined in claim 1 wherein said sealing ring has an annular ring about its outer surface intermediate said tapered lading and trailing edges; said annular ring having leading and trailing shoulders adjacent respectively said leading and trailing tapered edges; said leading shoulder engaging the adjacent end of said body member, forming a moisture seal therebetween.

4. The improvement as defined in claim 3 wherein said trailing shoulder engages said annular ring of said gland nut, forming a moisture seal therebetween.